United States Patent
Ishida et al.

(10) Patent No.: US 6,580,969 B1
(45) Date of Patent: Jun. 17, 2003

(54) LEGGED MOBILE ROBOT AND METHOD AND APPARATUS FOR CONTROLLING THE OPERATION THEREOF

(75) Inventors: Tatsuzo Ishida, Tokyo (JP); Yoshihiro Kuroki, Kanagawa (JP); Jinichi Yamaguchi, Tokyo (JP)

(73) Assignees: Sony Corporation, Tokyo (JP); Jinichi Yamaguchi, Tokyo (JP)

( * ) Notice: Subject to any disclaimer, the term of this patent is extended or adjusted under 35 U.S.C. 154(b) by 0 days.

(21) Appl. No.: 09/722,125

(22) Filed: Nov. 24, 2000

(30) Foreign Application Priority Data

Nov. 25, 1999 (JP) .............................. 11-334805
Oct. 16, 2000 (JP) ....................... 2000-314565

(51) Int. Cl.$^7$ .............................................. G06F 19/00
(52) U.S. Cl. ...................... 700/245; 700/246; 700/251; 700/253; 700/260; 700/261; 318/568.1; 318/568.12; 318/568.16; 318/568.17; 318/568.2; 901/1; 901/9; 901/46; 180/8.1; 180/8.6
(58) Field of Search ................................. 700/253, 245, 700/56, 258, 246, 251, 260, 261; 318/568.12, 568.2, 568.16, 568.17, 568.1, 568.11; 901/1, 9, 46; 180/8.6, 8.1

(56) References Cited

U.S. PATENT DOCUMENTS

| | | | | |
|---|---|---|---|---|
| 5,369,346 A | * | 11/1994 | Takahashi et al. | 318/568.17 |
| 5,378,969 A | * | 1/1995 | Haikawa | 318/568.12 |
| 5,402,050 A | * | 3/1995 | Ozawa | 318/568.12 |
| 5,416,393 A | * | 5/1995 | Gomi et al. | 318/568.2 |
| 5,594,644 A | * | 1/1997 | Hasegawa et al. | 701/23 |
| 5,737,217 A | * | 4/1998 | Nishikawa et al. | 700/56 |
| 5,872,893 A | * | 2/1999 | Takenaka et al. | 700/245 |
| 6,021,363 A | * | 2/2000 | Nishikawa et al. | 700/253 |

FOREIGN PATENT DOCUMENTS

EP    1 103 451 A2 *   5/2001

OTHER PUBLICATIONS

Kuffner et al., Motion planning for humanoid robots under obstacle and dynamic balance constraints, 2001, Internet/IEEE, pp. 1–7.*

Sugihara et al., Realtime humanoid motion generation through ZMP manipulation based on inverted pendulum control, 2000, Internet/IEEE, pp. 1404–1409.*

Hirai et al., The development of Honda humanoid robot, 1998, IEEE, pp. 1321–1326.*

Nicholls, Bipedal dynamic walking in robotics, 1998, Internet, pp. 1–74.*

Honda Motor Co., Ltd., Two–Legged Walking Robot: The Honda Humanoid Robot, 1996, Internet, p. 1.*

Ishida et al., Motion entertainment by a small humanoid robot based on OPEN–R, 2001, IEEE, pp. 1097–1086.*

Inaba et al., Two–armed bipedal robot that can walk, roll over and stand up, 1995, IEEE, pp. 297–302.*

* cited by examiner

Primary Examiner—William A Cuchlinski, Jr.
Assistant Examiner—McDieunel Marc
(74) Attorney, Agent, or Firm—Frommer Lawrence & Haug LLP; William S. Frommer

(57) ABSTRACT

A legged mobile robot is adaptively controlled in its attitude against variable external forces to continue the operation without inversion. When the legged mobile robot kicks an object having a certain mass, such as a ball, the robot is to be prevented from being fallen down by the reactive force from the object. Even if the mass or the repulsion coefficient of the object kicked is unknown, the operation of kicking the object at a sufficiently low speed is carried out at the outset to predict the reactive force produced on actual kicking in order to predict the reactive force produced on actual kicking. The result is that the stability in attitude can be maintained on kicking at an arbitrary speed. The legged mobile robot is able to take part as one of the players in athletic games, such as soccer games, in which each player performs his or her role as the or she is subjected to an external force.

18 Claims, 12 Drawing Sheets

LEGGED MOBILE ROBOT AND METHOD AND APPARATUS FOR CONTROLLING THE OPERATION THEREOF

BACKGROUND OF THE INVENTION

Field of the Invention

This invention relates to a control mechanism for a realistic robot constructed on modelling the mechanism or the operation of a living body. More particularly, the present invention relates to a control mechanism for a legged mobile robot which has modelled the bodily mechanism of an animal movable on legs, such as human being or monkeys.

More specifically, the present invention relates to a circuit mechanism for a legged mobile robot that can be widely applied in a living space and living environment of the human being and, more specifically, to the control method mechanism of a legged mobile robot that is able to adaptively control its attitude to continue its operation without falling.

The mechanism exploiting the electrical or magnetic action to execute a motion resembling the operation of the human being is called a robot. The word robot is said to originate from ROBOTA (slave machine). The robot came into widespread use towards the end of the sixties. The majority of the robots were industrial robots, such as manipulators or transporting robots, aimed at realization of automation or unmanned production operations in plants.

Recently, researches and development in legged mobile robots, simulating the body mechanism or operations of an animal walking in upstanding attitude on two legs, such as human being or robots, have made rapid progress such that practical utilization thereof is felt to be promising. Although motion on two legs is unstable and present difficulties in attitude or walking control as compared to that on four or six legs, it is excellent in realization of flexible motion operations, such as accommodation to walking surfaces presenting irregularities on the working path, such as non-bulldozed lands or lands presenting obstacles, or to non-continuous walking surfaces, such as staircases or ladders.

The legged mobile robots, emulating the mechanism of a human being, are called "human type" or "human style" robots (humanoid robots). The humanoid robot is able to perform life support for the human being, that is to support human activities in our living environments or our everyday life.

The significance of making researches and development in a robot called a humanoid robot can possibly be grasped from the following two viewpoints.

One of them is that from the human science. That is, through the process of creating a robot having a structure resembling a leg and/or a foot of a human being, devising its control method and simulating the walking performance of the human being, it is possible to technically elucidate the mechanism of the natural human behavior such as walking as the first and foremost human behavior. The results of these researches will appreciably contribute to significant progress in a variety of research fields handling human motion mechanisms in the human engineering, rehabilitation engineering and in the sports sciences.

The other is development of a robot supporting our lives as human partners, that is supporting human activities in various situations in our living environments and in our everyday lives. This sort of the robot needs to learn how to adapt itself to human beings with different personalities or to different environments to make further growths in functional aspects as it learns the performance or manners from the human being in various aspects of our living environments. It may be contemplated that, if the robot is the humanoid robot, that is if the robot is of the same shape or structure as the human being, the robot will operate effectively in having smooth communication with the human being.

For example, if it is necessary to teach a robot to pass through a room as it evades an obstacle it is not allowed to tramp, the user (operator) must find it easier to teach the robot, while the robot will find it easier to learn, if the robot is able to walk on two legs like the human being, than if the robot is of the crawler type or of the four-legged type (see, for example, Takanishi, "Control of a Robot Walking on Two Legs"), appearing in "Ko-So", Car Technique Society, Kanto Branch, No.25, 1996 April).

The majority of the human working or living spaces are realized to suit to the bodily mechanism or behavioral pattern of the human being in the form of upstanding walking on two legs. Stated differently, a large number of obstacles are present in the human living space for the present-day mechanical system having wheeled or the like driving devices as motion means. So, in order for the robot as a mechanical system to operate on behalf of the human being in a variety of human operations and to adapt itself more intricately to the living space of the human being, it is desirable that the range of possible motion of the robot be approximately equal to that of the human being. This accounts for expectations generally entertained in the realization of legged movable robots. The fact that the robot has a human type style may be said to be indispensable in elevating the affinity to the human living environment.

Among the usages of the human type robot, there is the usage of taking over the miscellaneous operations in the industrial and productive activities. Examples of these are maintenance operations in nuclear power plants or thermal power plants, transport and/or assembling operations of component parts in petrochemical plants, maintenance operations in high-rise buildings and rescue operations in conflagration or the like calamities.

Among other usages of the human type robots, there is a usage of life adherent type usage, that is the usage aimed at co-existence with human being, rather than life supporting type usage, such as taking over difficult or painful operations. It is a supreme object of this type of robot to faithfully reproduce the full body exercising type operating mechanism proper to an animal walking on two legs, such as human being or monkeys. Moreover, the human type robot, emulating the animal of high intellect, such as human being or monkeys, is desirably spontaneous in its performance exploiting its four limbs as a living body besides being expressive in its behavior. In addition, the human type robot is required not only to execute the pre-input operating pattern faithfully, but also to realize vivid behavioral expressions responsive to the words or demeanor of the human being such as praising or admonition. In this meaning, the entertainment-oriented human type robot, emulating the human being, may be worth being called a "human type" robot.

In a well-known manner, the human being has hundreds of articulations, that is hundreds of degrees of freedom. Although it is desirable to afford approximately the same number of degrees of freedom to the legged movable robot in order to impart the performance as close to that of the human being as possible, this is technically of utmost difficulty. The reason is that, although at least one actuator needs to be provided for each degree of freedom, it is well-nigh impossible to have hundreds of actuators mounted on a robot as a mechanical device because of designing limitations in weight or size. On the other hand, if there are many degrees of freedom, the volume of calculations for robot positions, behavioral pattern control or attitude stabilization control, is exponentially increased.

From this reason, the routine practice is to construct the human type robot with the degrees of freedom on the order of tens of articulations which is appreciably smaller than those of the human beings. Therefore, in designing and control of the human type robot, it may be said to be crucial how more spontaneous performance is to be realized with the smaller number of degrees of freedom.

The legged mobile robot walking on legs is superior in being able to walk or run flexibly such as walking or running on a staircase or over an obstacle, however, it is difficult to control in attitude or stable walking because the number of legs is smaller and the center of gravity position is elevated. In particular, in the case of a humanoid robot, it is necessary to control the body attitude or stabilized walking as the spontaneous motion or feeling of an intellectual animal such as a human being or a monkey is expressed plentifully.

A large number of proposals have already been made in the technology pertinent to attitude control or stable walking in the legged mobile robot walking on two legs. The stable "walking" herein may be defined to mean "Motion using legs without falling down".

For evading robot falling, stable attitude control of the legged mobile robot is of utmost importance, because falling means interruption of the operation being executed by the robot and a lot of loss in time and labor for the robot to erect itself from its fallen state to re-initiate the operation, and also because the falling tends to inflict fatal damage not only to the robot itself but also to the object colliding against the robot. Therefore, stable attitude control and prevention of falling during walking may also be said to be of utmost importance in the designing and engineering of the legged mobile robot.

During walking, the force of gravity and inertia as well as the moments thereof act from the walking system to the road surface due to the force of gravity and the acceleration generated by the walking motion. The so-called d'Alembert's principle states that these are counterbalanced by the reactive force from the floor as the reaction from the road surface to the walking system, and the moments thereof. As the conclusion of the mechanical deduction, there is present a point of zero pitching and rolling moments, that is the zero moment point "ZMP" on one of the sides of a supporting polygon constituted by the road surface and contact points of the foot soles with the floor, or on the inner sides thereof.

The majority of the proposals in stable attitude control and prohibition of falling during walking use this ZMP as the criterion of verifying the walking stability. The two-legged walking pattern generation based on the ZMP criterion has many advantages, such as pre-settable foot sole contact point with the floor surface or ease in taking account of the local constraint conditions of the leg tip conforming to the road surface shape.

For example, the Japanese Laying-Open Patent H-5-305579 discloses a walking control device for a legged mobile robot, in which the ZMP (zero moment point), that is a point on the floor surface where the moment by the reactive force from the floor during walking is equal to zero, is controlled to be coincident with a target value.

The Japanese Laying-Open Patent H-5-305581 discloses a legged mobile robot in which the ZMP is designed to be within the inside of a supporting polygon or at a position of certain allowance from the end thereof when the leg of the robot touches or leaves the floor surface. The result is certain ZMP allowance by a pre-set distance even under disturbances thus contributing to improvement in walking stability.

Moreover, the Japanese Laying-Open Patent H-5-305583 discloses controlling the walking speed of the legged mobile robot depending on the target ZMP position. That is, the legged mobile robot disclosed in the above-referenced publication uses pre-set walking pattern data and is adapted for driving the leg joints to bring the ZMP into coincidence with the target position while detecting the tilt of the upper limb portion to change the walking pattern data emitting speed pre-set depending on the detected value. As a result, if the robot is tilted forwards as it tramps on unexpected irregularities, the emitting speed may be increased to recover its attitude. Also, since the ZMP can be controlled to its target position, the emitting speed can be changed without any impediments when both legs of the robot touch the floor surface.

The Japanese Laying-Open Patent H-5-305585 discloses controlling the floor surface touching position of the legged mobile robot by the ZMP target position. That is, the legged mobile robot disclosed in this publication detects an error between the ZMP target position and the measured position and drives one or both legs in a direction to cancel out the error. Alternatively, the legged mobile robot detects the moment about the ZMP target position and drives the leg to reduce the moment to zero to realize stable walking.

On the other hand, the Japanese Laying-Open Patent H-5-305586 discloses controlling the inclined position of the legged mobile robot by the ZMP target position. That is, the legged mobile robot disclosed in this publication detects the moment about the ZMP target position and, in the presence of a moment, the legs are controlled to reduce the moment to zero to realize stable walking.

The external force to which the legged mobile robot is subjected during walking performance is the reactive force from the floor as the reaction from the floor surface to the walking system. So, by searching the ZMP corresponding to zero pitching and rolling moments on or inside of the sides of the supporting polygon constituted by the foot sole touching point on the floor and the floor surface, it is possible to realize a stable walking performance. The above-mentioned conventional techniques perform adaptive control to the reactive force from the floor.

However, since the legged mobile robot supports or takes over a variety of human operations in the same living space or environment as that of the human being, and ultimately is aimed at co-existence with the human being, the operations actually executed by the legged mobile robot are not simply limited to the walking performance.

The natural consequence of this is that the external force to which the legged mobile robot is subjected in the human living space or environment is not limited to the reactive force from the floor surface.

For example, an entertainment-oriented humanoid robot may take part as a player in a ball game, such as soccer game. In such case, an external force may be applied to the leg or head during kicking or heading of a soccer ball. Moreover, in a karate game, considerable external force tends to be applied to the robot when applying or evading a foot trick.

For example, when a soccer ball, for example, is to be kicked at an elevated speed, a strong reactive force is applied from the soccer ball, as a result of which the robot tends to be unstable or even fallen. If the robot is fallen, not only is the operation discontinued, but the robot tends to be fatally damaged under an impact on falling. In addition, on falling, the counterpart side person or robot tends to be injured or destroyed.

Thus, for realizing extensive application of the legged mobile robot to the human living space or environment, it is necessary, realize to make adaptive control of the legged mobile robot under assumption of a variety of types of external forces.

SUMMARY OF THE INVENTION

It is therefore an object of the present invention to provide an control mechanism for the legged mobile robot extensively applicable in the human living space or environment.

It is another object of the present invention to provide a control method mechanism for a legged mobile robot in which it is possible to effect adaptive position control against a variety of external forces to continue the operation without the risk of falling.

In a first aspect, the present invention provides an apparatus for adaptively controlling motions of a legged mobile robot, made up at least of lower limbs, a body trunk and a waist part, against an external force, in which the apparatus includes first setting means for setting leg motion, body trunk motion and upper limb motion, and the attitude and height of the waist part, for realizing the required motion, second setting means for setting a ZMP trajectory based on the leg motion as set by the first setting means, third setting means for setting an external force pattern applied to the legged mobile robot, calculating means for calculating the moment generated on a ZMP as set by the second setting means based on the leg motion, body trunk motion, upper limb motion and the attitude and height of the waist part as set, means for finding a solution of the waist motion for which the moments as calculated by the calculating means are in equilibrium and means for executing the full body exercise motion based on the solution of the waist motion. The present invention also providers a corresponding control method.

In a second aspect, the present invention provides an apparatus for adaptively controlling motions of a legged mobile robot, made up at least of lower limbs, a body trunk and a waist part, against an external force, in which the apparatus includes first setting means for setting leg motion, body trunk motion and upper limb motion, and the attitude and height of the waist part, for realizing the required motion, second setting means for setting a ZMP trajectory based on the leg motion as set by the first setting means, third setting means for setting an external force pattern applied to the legged mobile robot, calculating means for calculating the moment generated on a ZMP as set by the second setting means by the leg motion, body trunk motion, upper limb motion and the altitude and height of the waist part as set, first finding means for finding an approximate solution of the waist motion, for which the moments as found by the calculating means are in equilibrium, using a non-precise model of the robot, second finding means for finding an approximate solution of the waist motion, for which the moments as found by the calculating means are in equilibrium, using a precise model of the robot, means for assuming a solution of the waist motion if a difference between the approximate solutions by the first and second finding means is less than a pre-set allowed value, means for correcting the moments of the non-precise model on the pre-set ZMP if the difference between the approximate solutions by the first and second finding means exceeds the pre-set allowed value and for re-throwing the corrected moments to the first finding means, and means for executing the full body exercise motion of the legged mobile robot based on the solution of the waist motion. The present invention also providers a corresponding control method.

In the operation control apparatus or method for the robot according to the second aspect, the non-precise model is a linear and/or non-interference multiple mass point approximating model for the robot. The precise model may be a rigid body model or a non-linear and/or interference multiple mass point approximating model for the robot.

In the operation control apparatus or method for the robot according to the second aspect, there may be provided a step or means for re-setting or correcting the pattern of the body trunk motion and upper limb motion, if the pre-set body trunk motion and upper limb motion cannot be realized with the approximate solution as found by the first finding means for finding the approximate solution of the waist motion by the non-precise model.

The first finding means for finding the approximate solution of the waist motion by the non-precise model may find the approximate solution of the waist motion by solving an equation of equilibrium between the leg motion, body trunk motion, upper limb motion and the moment on the pre-set ZMP produced by the external force pattern on one hand and the moment on the pre-set ZMP generated by motion within the horizontal plane of the waist part.

The first finding means for finding the approximate solution of the waist motion by the non-precise model may perform calculations on substituting a frequency-domain function for a time-domain function.

The first finding means for finding the approximate solution of the waist motion by the non-precise model may also find the approximate solution of the waist motion by applying Fourier expansion to moments on the pre-set ZMP generated by the leg motion, body trunk motion and the upper limb motion, by applying Fourier expansion to the moment on the pre-set ZMP produced by the external force pattern and to the motion in the horizontal plane of the waist part, by calculating Fourier coefficients of the trajectory of the horizontal plane of the waist part and by applying the inverse Fourier expansion.

The third setting means for setting the external force pattern predicts an external force pattern produced on applying an impact on an object at a pre-set speed based on the chronological external force process and a force application point when the external force pattern is applied to the object at a speed lower than the pre-set speed.

In a third aspect, the present invention provides a legged mobile robot including two or more movable legs, an upper body portion connected to the movable legs, means for detecting an external force applied from an external object to the movable leg and control means for adaptively controlling the motion of the movable leg and/or the upper body portion in accordance with detected results by the external force detecting means.

The legged mobile robot in the third aspect of the present invention is able to kick an external object, such as a ball, using e.g., one of the movable legs. The external force detection means detects the reactive force produced when the movable leg kicks the external object. The control means is able to adaptively control the operation of the movable leg and/or the upper body portion in accordance with the so-detected reactive force.

When the legged mobile robot kicks the external object, the mass and/or the repulsion coefficients of which is unknown, the movable leg kicks the external object at a speed lower than the pre-set speed for trial sake. In such case, the control means is able to predict the mass and/or repulsion coefficients when the robot kicks the object at the pre-set speed, based on an output of the external force detection means, by way of learning. When the robot actually kicks the external object at the pre-set speed, the operation of the movable leg and/or the upper body portion can be adaptively controlled in accordance with the results of the predictive learning.

With the legged mobile robot 100 according to the present invention, the robot kicking an external object of a pre-set mass may be prevented from being fallen down under an external force such as a reactive force applied from the kicked ball.

The legged mobile robot is able to continue the operation, as its attitude stability is kept, not only in the sole operation of kicking, but in a variety of operations of producing a certain motion of the object by exploiting a portion of the robot body or trunk.

Moreover, if, in the kicking operation, the mass or the repulsion coefficient of the kicked object, such as a soccer ball, is unknown, the operation of kicking the ball several times at a low speed not affecting attitude stability may be carried out several times at the outset to predict the reactive force applied to the robot on kicking at a high speed. As a result, attitude stability may be maintained when the robot kicks the object at an arbitrary speed.

The legged mobile robot embodying the present invention is able to take part as a player in a ball game exemplified by a soccer game or other athletic games in which the players perform their rolls in accordance with the game rule as an external force is applied to the players.

According to the present invention, as described above, there is provided a control mechanism for a legged mobile robot which may be extensively utilized in a human living space or environment.

According to the present invention, there may also be provided a control method mechanism in which the robot is able to continue the operation without falling as the attitude is adaptively controlled against variable external forces.

If, in the legged mobile robot of the present invention, the operation of kicking an object having a pre-set mass, the robot may be prevented from being fallen down under an external force such as a reactive force applied from the kicked ball.

It is also possible to continue the operation of the legged mobile robot, as its attitude stability is maintained, not only in the sole operation of kicking, but also in a variety of other operations exerting a pre-set motion on an object under exploitation of a portion of its body, such as hand, head or trunk.

It is moreover possible to predict the reactive force produced on actual kicking, by carrying out the operation of kicking an object at a low speed not affecting the attitude stability several times at the outset, even if the mass or the repulsion coefficient of the object is not known.

The legged mobile robot of the present invention is able to take part as a player in a ball game exemplified by a soccer game or other athletic games in which the players perform their rolls under application of an external force in accordance with the prescribed game rule.

Other objects, features and advantages of the present invention will become more apparent from the following detailed description of the present invention and the claims.

DESCRIPTION OF THE PREFERRED EMBODIMENTS

Figure 1:
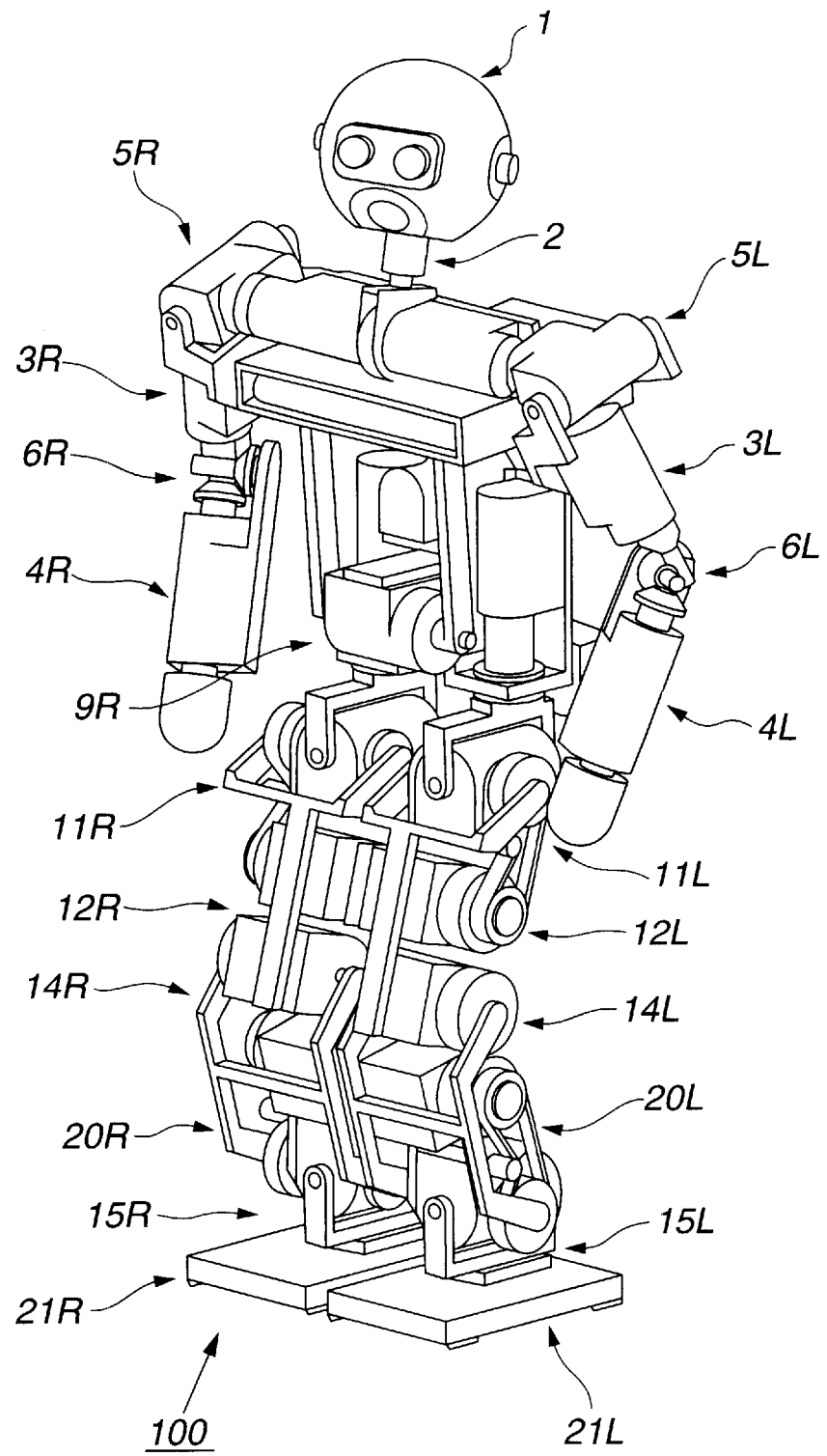
FIG. 1 shows a legged mobile robot 100 of the present invention looking from the front side.

Referring to the drawings, preferred embodiments of according to the present invention will be explained in detail.

Figure 2:
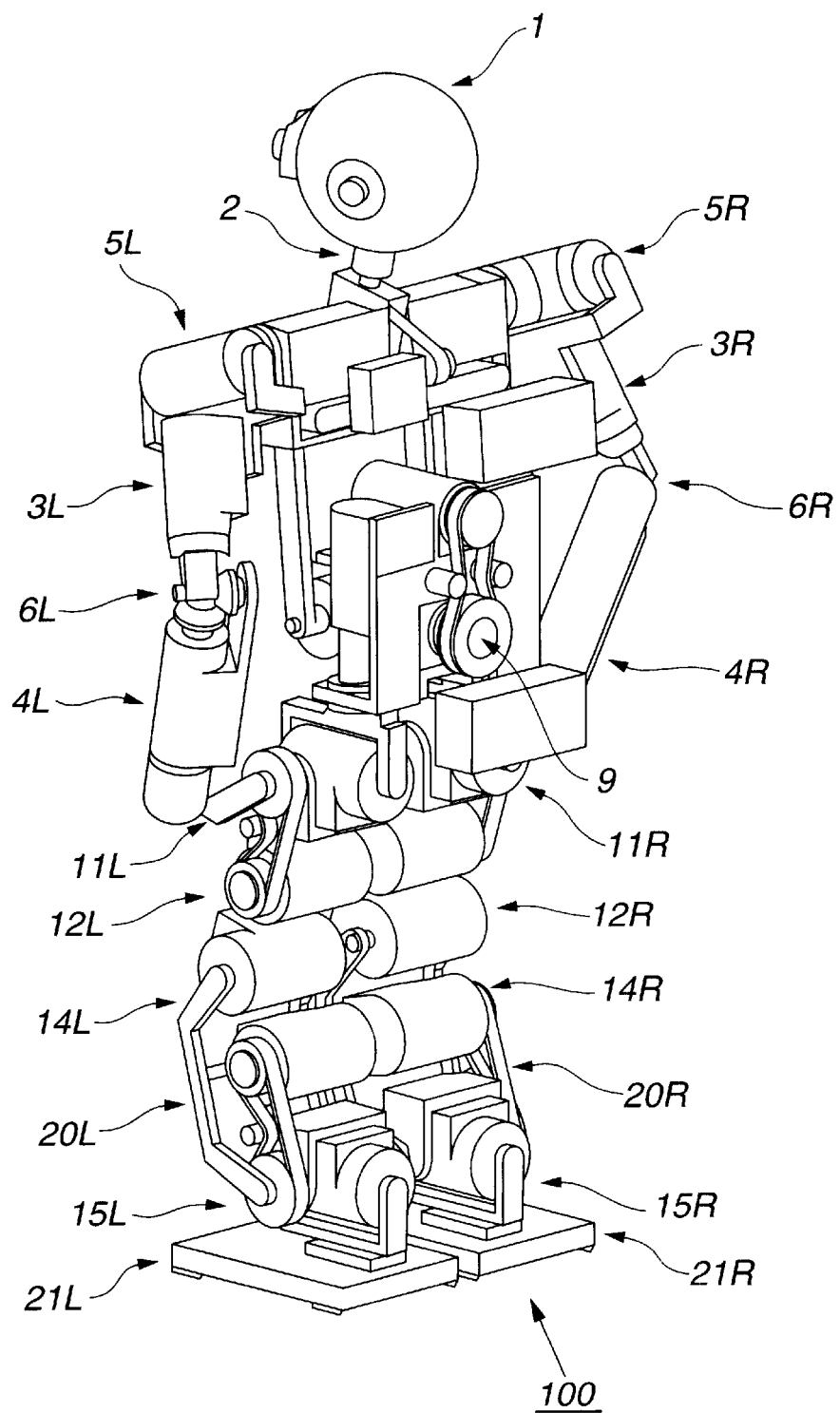
FIG. 2 shows the legged mobile robot 100 of the present invention looking from the back side.

FIGS. 1 and 2 show a legged mobile robot 100 of the humanoid type in a erected attitude, looking from the front and back sides. As shown, the legged mobile robot 100 is made up of a two left and right lower limbs, a body trunk, left and right upper limb portions, a head and a controller.

The left and right lower limb portions are made up of left and right thighs 12L, 12R, left and right knee joints 14L, 14R, left and right shins 20L, 20R, left and right ankles 15L, 15R, and foot soles 21L, 21R, respectively, and are linked to the lowermost ends of the body trunk 9 by left and right hip joints 11L, 11R, respectively. The left and right upper limb portions are made up of left and right arms 3L, 3R, left and right elbow joints 6L, 6R and left and right forearms 4L, 4R, respectively, and are connected to the upper left and right side edges of the body trunk 9 by shoulder joints 5L, 5R, respectively. The head 1 is connected to approximately the center of the uppermost end of the body trunk 9.

The controller is a casing carrying a main controller for processing external inputs from e.g., a sensor or a driving controller for each joint actuator making up the legged mobile robot 100, and also carrying a power source circuit or other peripheral equipment. The controller may contain an communication interface for remote control or communication devices. Although the legged mobile robot 100 of the embodiment shown in FIGS. 1 and 2 carries the controller on its back, there is no particular limitation to the controller mounting position.

As a hypothesis for performing adaptive control against an external force on the legged mobile robot 100 of the present embodiment, it is presupposed that a mechanism for sensing an external force is provided at a site to which an external force is assumed to be applied. For example, if the legged mobile robot 100 takes part in a soccer game as a player, a force sensor is mounted on a foot of the robot subjected to an external force as a result of kicking an external object, such as a ball.

Figure 3A:
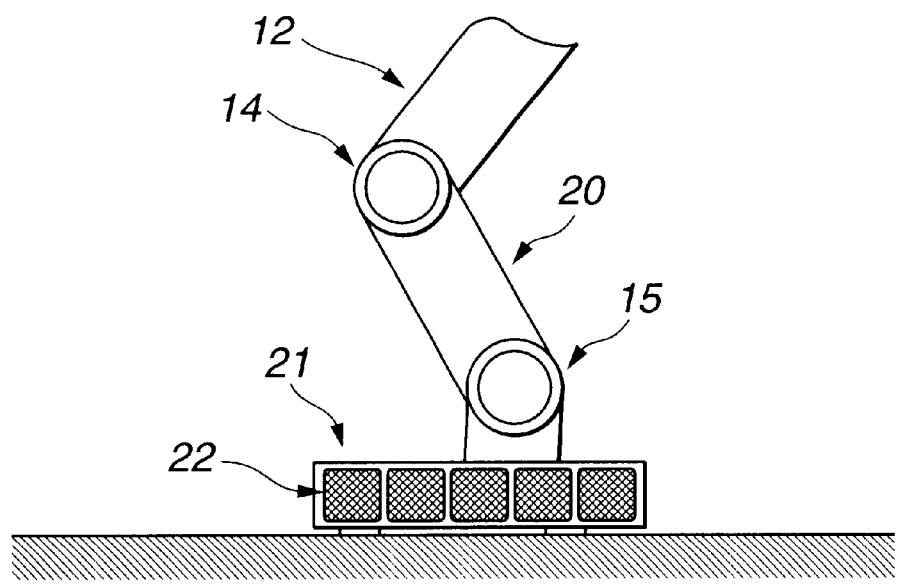
FIGS. 3A and 3B show a force sensor mounted on the flat portion of the foot palm of the legged mobile robot 100 for making adaptive control of the ball kicking operation.
Figure 3B:
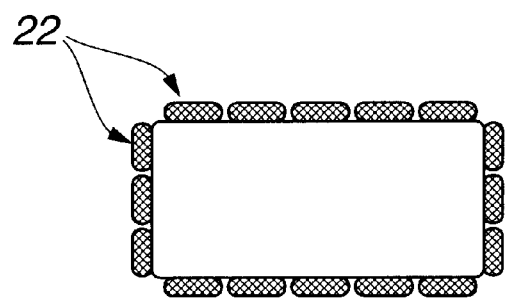

FIGS. 3A and 3B illustrate the side view and bottom view of the foot sole 21 carrying the force sensor, respectively. In the embodiment shown therein, a force sensor 22 is bonded to a foot sole 21 for detecting the force applied to the foot sole 21 from an optional direction. The force sensor 22 may be any suitable device, such as a FSR (force sensitive resistor) showing an electrical resistance proportional to the applied force.

Figure 4:
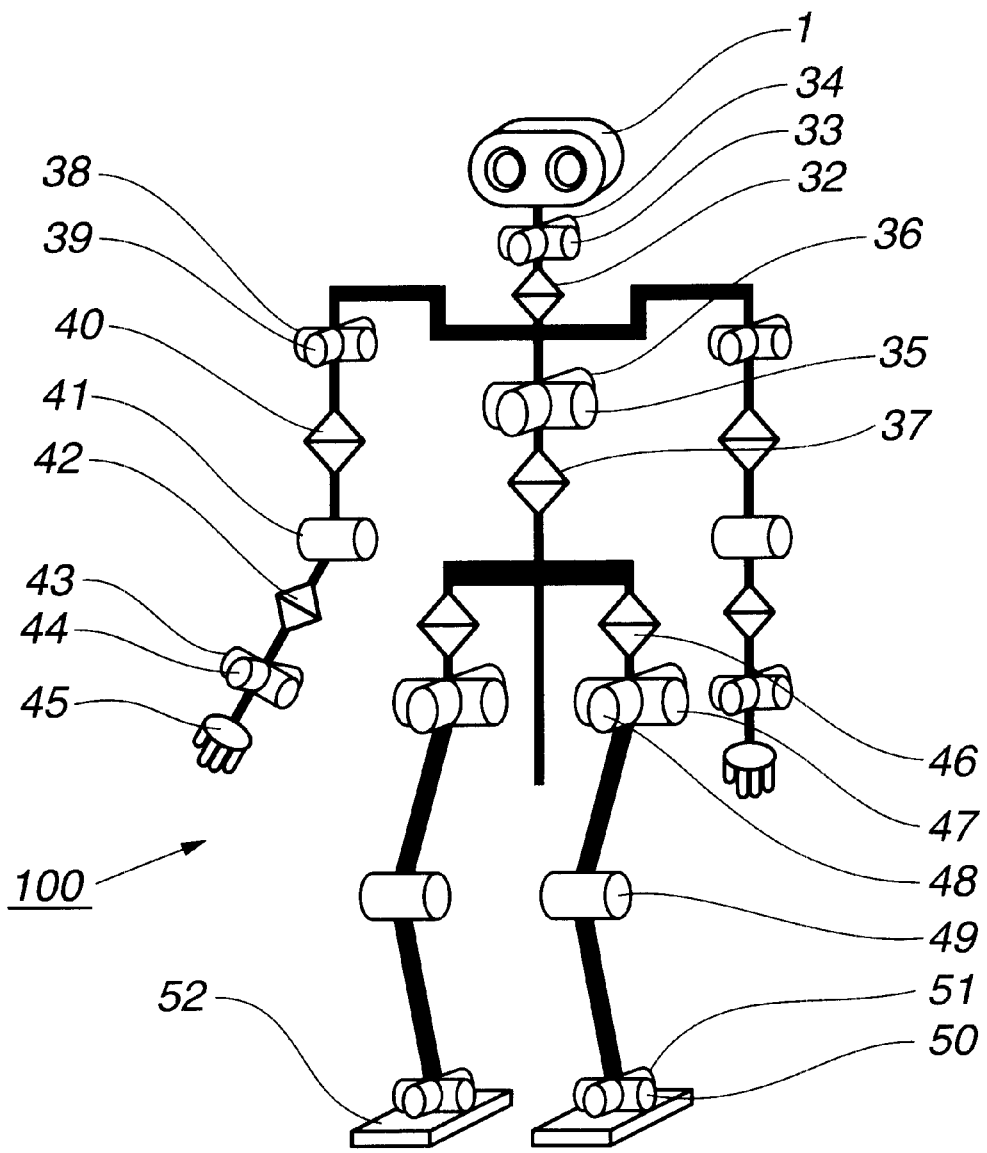
FIG. 4 schematically shows a degree of freedom constituting model provided on the legged mobile robot 100 of the present invention.

FIG. 4 shows the configuration of the degree of freedom of a joint provided on the legged mobile robot 100 of the present embodiment. As shown therein, the legged mobile robot 100 is made up of an upper limb portion, inclusive of two arms and a head, and a lower limb portion, realizing the motion operations, and a trunk portion interconnecting the upper limb portion and the lower limb portion.

The head 1 is supported by a neck joint having three degrees of freedom, namely a neck joint yaw axis 32, a neck joint pitch axis 33 and a neck joint roll axis 34.

Each arm is made up of a shoulder joint pitch axis 38, a shoulder joint roll axis 39, an upper arm yaw axis 40, an elbow joint pitch axis 41, a forearm yaw axis 42, a wrist joint pitch axis 43, a wrist joint roll axis 44 and a hand 45.

The trunk portion has three degrees of freedom, namely a body trunk pitch axis 35, a body trunk roll axis 36 and a body trunk yaw axis 37.

Each of the left and right feet, constituting the lower limb portion, is made up of a hip joint pitch axis 47, a hip joint roll axis 48, a knee joint pitch axis 49, an ankle joint pitch axis 50, an ankle joint roll axis 51, and a foot (foot sole) 52. A point of intersection between the hip joint pitch axis 47 and the hip joint roll axis 48 delimits the hip joint position of the robot of the present embodiment. The foot (foot sole) 52 of a human being actually is a structure inclusive of the foot sole of multiple articulations and multiple degrees of freedom, while the legged mobile robot 100 of the present embodiment has a zero degree of freedom. Therefore, the left and right feet are constituted by six degrees of freedom.

To summarize, the legged mobile robot 100 of the present embodiment in its entirety has a sum total of 3+7×2+3+6×2=32 degrees of freedom. Of course, the number of degrees of freedom of joints may be suitably increased or decreased depending on constraint conditions and required specifications in designing and manufacture.

The above-described degrees of freedom, owned by the legged mobile robot 100, are in reality mounted using an actuator. In view of a demand for simulating the natural body shape of the human being and for attitude control despite the unstable structure attributable to walking on two legs, to the exclusion of redundant swelling in appearance, the actuator is desirably small-sized and lightweight. The actuator loaded in the present embodiment is a small-sized AC servo actuator of the direct gear connecting type in which the servo control system is arranged as one chip and enclosed in a motor unit. The AC servo actuator of this type is disclosed in e.g., the Japanese Patent Application H-11-33386 assigned to the present assignee.

Figure 5:
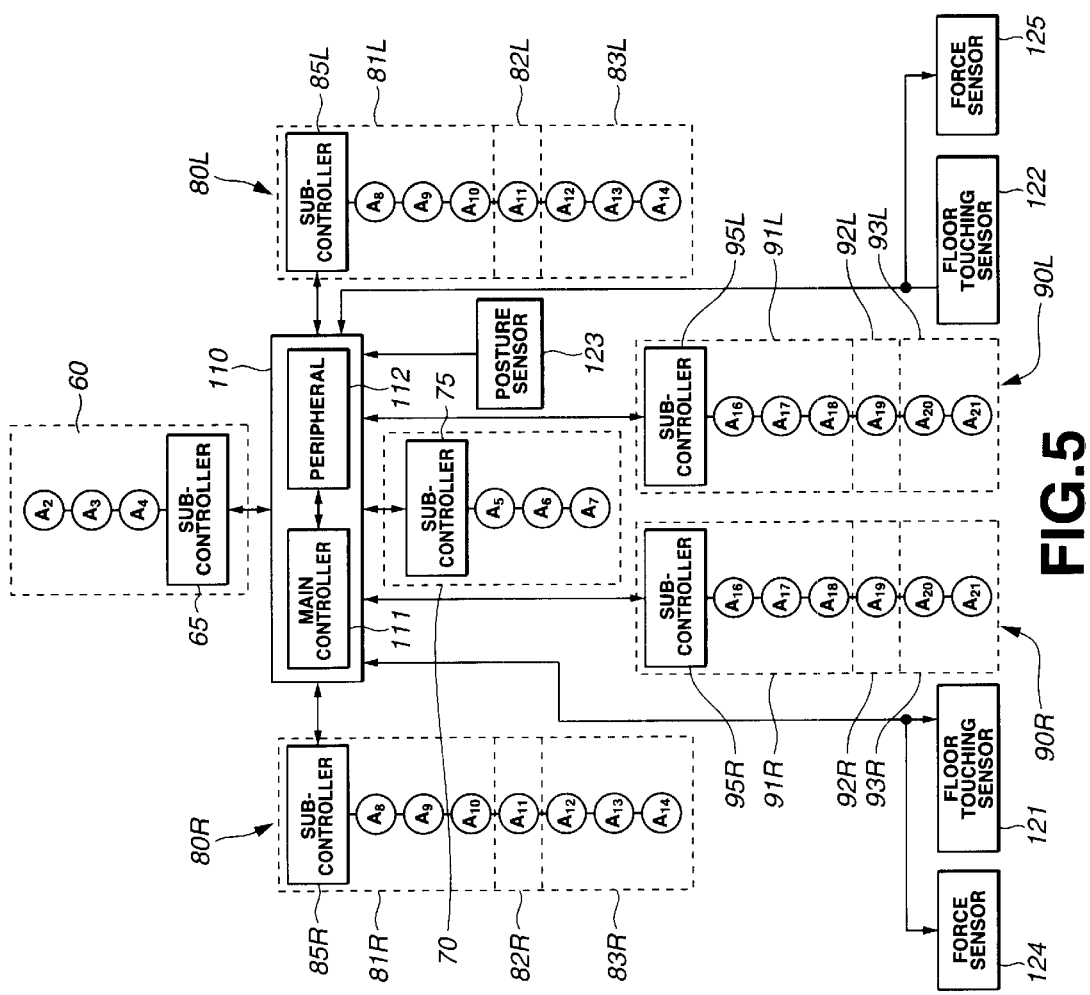
FIG. 5 schematically shows the control system configuration of the legged mobile robot 100 according to the present invention.

FIG. 5 schematically shows the control system configuration of the legged mobile robot 100 of the present embodiment. As shown therein, the legged mobile robot 100 is made up of respective mechanical units 60, 70, 80 and 90 R/L representing four limbs of the human being, and a control unit 110 adapted for performing adaptive control for realizing concerted operations among respective mechanical units. It is noted that R and l denote right and left, respectively.

The operation of the entire legged mobile robot 100 is comprehensively controlled by the control unit 110 made up of a main controller 111, comprised of main circuit components, such as CPU (central processing unit) chip or a memory chip, not shown, and a peripheral circuit 112, comprised of an interface, also not shown, for exchanging data or commands with a power source device or with the respective constituent elements of the robot 100.

In the present embodiment, the power source device includes a battery for independently driving the robot 100. If the power source is of the independent driving type, the humanoid robot 100 is able to walk freely without the radius of motion of the robot 100 being physically limited by the power cable or the power source receptacles for commercial use. On the other hand, there is no necessity of taking into account the interference between the power source cable and the four limbs during the time of variable exercises such as walking or other motions inclusive of those of the upper limb portions, such that autonomous motions inclusive of the motion operations in a wide range of operational spaces, such as galloping in a soccer field, is facilitated.

The respective degrees of freedom of joints of the robot 100 shown in FIG. 4 are realized by the respective associated actuators. That is, the head unit 60 is provided with a neck joint yaw axis actuator $A_2$, a neck joint pitch axis actuator $A_3$ and a neck joint yaw axis actuator $A_4$, representing the neck joint yaw axis 32, neck joint pitch axis 33, neck joint roll axis 34, respectively.

The body trunk unit 70 is provided with a body trunk pitch axis actuator $A_5$, a body trunk roll axis actuator $A_6$ and a body trunk yaw axis actuator A7, representing the body trunk pitch axis 35, body trunk roll axis 36 and the body trunk yaw axis 37, respectively.

The arm unit 80 R/L is subdivided into an upper arm unit 81R/L, an elbow joint unit 82R/L and a forearm unit 83R/L. There are provided a shoulder joint pitch axis actuator $A_8$, a shoulder joint pitch axis actuator $A_9$, a forearm yaw axis actuator $A_{10}$, an elbow joint pitch axis actuator $A_{11}$, a forearm yaw axis actuator $A_{12}$, a wrist joint pitch axis actuator $A_{13}$ and a wrist joint roll axis actuator $A_{14}$, representing the shoulder joint pitch axis 38, shoulder joint roll axis 39, forearm yaw axis 40, elbow joint pitch axis 41, forearm yaw axis 42, wrist joint pitch axis 43 and the wrist joint roll axis 44, respectively.

The foot unit 90R/L is subdivided into a thigh unit 91R/L, a knee joint unit 92R/L and an ankle unit 93R/L. There are provided a hip joint yaw axis actuator $A_{16}$, hip joint pitch axis actuator $A_{17}$, a hip joint roll axis actuator $A_{18}$, a knee joint pitch axis actuator $A_{19}$, an ankle joint pitch axis actuator $A_{20}$ and an ankle joint roll axis actuator $A_{21}$, representing the hip axis yaw axis 46, hip joint pitch axis 47 hip joint roll axis 48, hip joint pitch axis 49, ankle joint pitch axis 50 and the ankle joint roll axis 51, respectively.

The above-described respective joint actuators $A_2, A_3, \ldots$, are more preferably small-sized AC servo actuators of the direct gear connecting type in which the servo control system is arranged as one chip and enclosed in a motor unit.

For the head unit 60, body trunk unit 70, arm unit 80 and the leg unit 90, sub-controllers 65, 75, 85 and 95 for driving the actuators are provided, respectively. In addition, there are provided floor contact check sensors 121, 122 and external force sensors 124, 125 for detecting whether or not the foot soles of the leg units R, L have touched the floor, while there is provided an attitude sensor 123 for measuring the attitude in the body trunk unit 70.

The floor surface contact sensors 121, 122 are realized e.g., by proximity sensors or micro-switches mounted e.g., on the foot sole. The attitude sensor 123 may be configured e.g., as an acceleration sensor. The external force sensors 124, 125 are designed as an assembly of a large number of force sensors bonded to left and right foot soles.

Based on outputs of the floor contact check sensors 121, 122, it can be discriminated whether each of the left and right legs are set on or clear the floor surface during the operating periods such as walking or running. Based on outputs of the external force sensors 124, 125, it is possible to detect the magnitude and the direction of the external force applied to the left and right foot soles. Moreover, based on the output of an attitude sensor 93, it is possible to detect the tilt or the orientation of the body trunk portion.

The main controller 111 is able to dynamically correct the control target responsive to the outputs of the respective sensors 121 to 125. More specifically, the sub-controllers 65, 75, 85 and 95 may be adaptively controlled to realize the concerted operation of the upper limb, body trunk and the lower limb portions of the humanoid robot 100. The main controller 111 sets the floor motion, ZMP (zero moment point) trajectory, motion of the body trunk, motion of the upper limb portion or the height of the waist portion, in accordance with e.g., a user command, while transferring a command for instructing an operation conforming to the setting contents to the sub-controllers 65, 75, 85 and 95. The "ZMP" herein means a point on the floor surface where the moments due to the reactive force from the floor surface during walking is zero, while the "ZMP trajectory" means a trajectory along which the ZMP travels during the robot walking time.

The sub-controllers 65, 75, 85 and 95 interpret control command values transferred from the main controller 111 to output driving control signal to each of the joint actuators A2, A3, . . . .

In the present embodiment, a multiple mass point approximating model is physically substituted further for the humanoid robot 100 provided with the multiple joint degree of freedom configuration shown in FIG. 4 to perform the processing for calculating the full body exercising body motion pattern. The real humanoid robot 100 is a set of infinite, that is continuous, mass points. However, the volume of calculations can be diminished by substituting the approximate model, made up of a finite number of discrete mass points, for the set of the infinite mass points.

Figure 6:
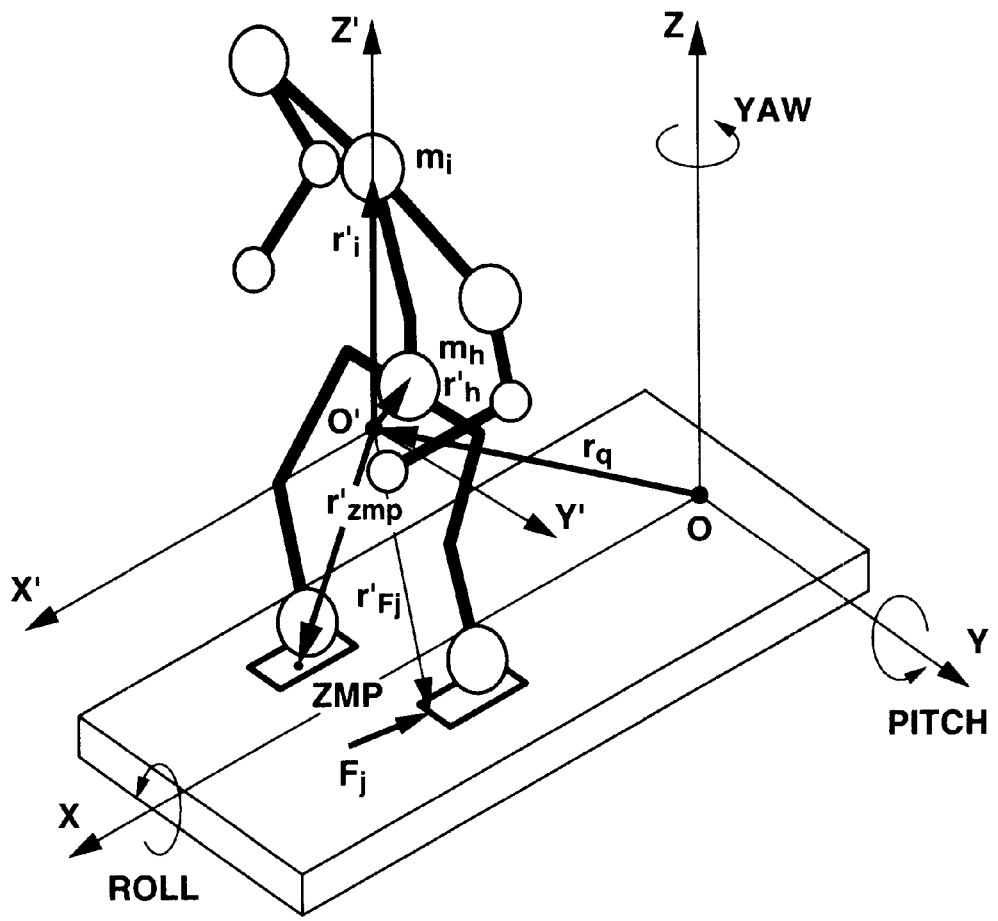
FIG. 6 shows a linear non-interference multiple mass point simulating model of the legged mobile robot 100 introduced for calculating the walking control according to the present invention.

FIG. 6 illustrates a liner non-interference multiple mass point approximating model of the legged mobile robot 100, introduced for calculating the full body exercising body motion pattern of the present embodiment.

In FIG. 6, the O–XYZ coordinate system denotes roll, pitch and yaw axes in the absolute coordinate system, whilst the O'–X'Y'Z' coordinate system denotes roll, pitch and yaw axes in the local coordinate system moving with the legged mobile robot 100. In the mass point approximating model, shown therein, i denotes a suffix representing the i'th mass point, while mi and $r'_i$ denote the mass of the i'th mass point and the position vector of the i'th mass point in the local coordinate system, respectively. The mass of the mass point of the waist portion, which is particularly critical in the full body exercising concerted motion pattern, as later explained, is denoted $m_h$, with its position vector being $r'_h$ ($r'_{hx}$, $r'_{hy}$ and $r'_{hz}$). The position vector of the ZMP is denoted $r'_{zmp}$.

In FIG. 6, $F_j$ is a j'th external force applied to the legged mobile robot 100. In the present embodiment, calculations for stable attitude control, as later explained, are executed on the assumption that the external force $F_j$ is known from the outset. The components in the x, y and z directions of the j'th force $F_j$ are set to $F_{jx}, F_{jy}$ and $F_{jz}$, while the positions vectors of the point on which acts the external force $F_j$ are set to $r'_{FJ}$ ($r'_{Fjx}, r'_{Fjy}, r'_{Fjz}$). In the embodiment shown in FIG. 6, the j'th external force is the known force of reaction to which the foot sole 12L is subjected from a ball kicked with the left foot.

In the non-precision multiple mass point approximating model, shown in FIG. 6, the moment equation is written as a linear equation, with the moment equation not affecting the pitch and roll axes.

This multiple mass point approximating model can be generated roughly by the following processing sequence:

(1) The mass distribution of the overall robot 100 is found.

(2) Then, respective mass points are set. The mass points may be set manually by a designer or automatically in accordance with a pre-set rule.

(3) The entire body of the robot is divided into a pre-set number of discrete areas i. The center of gravity then is found for each area i and the center of gravity position and the mass mi are imparted to each relevant mass point. The division into discrete areas may be by manual operations by the designer or by automatic processing.

(4) Each mass point $m_i$ is represented as a sphere centered about the mass point position $r_i$ and having a radius proportional to its mass.

(5) The mass points, that is the spheres, interconnected in reality, are interconnected.

The multiple mass point approximating model represents the robot 100 by, so to speak, a wire frame model. In the present embodiment of the multiple mass point approximating model, both shoulders, both elbows, both wrists, the body trunk portion, the waist site and both ankles are set as mass points.

Figure 7:
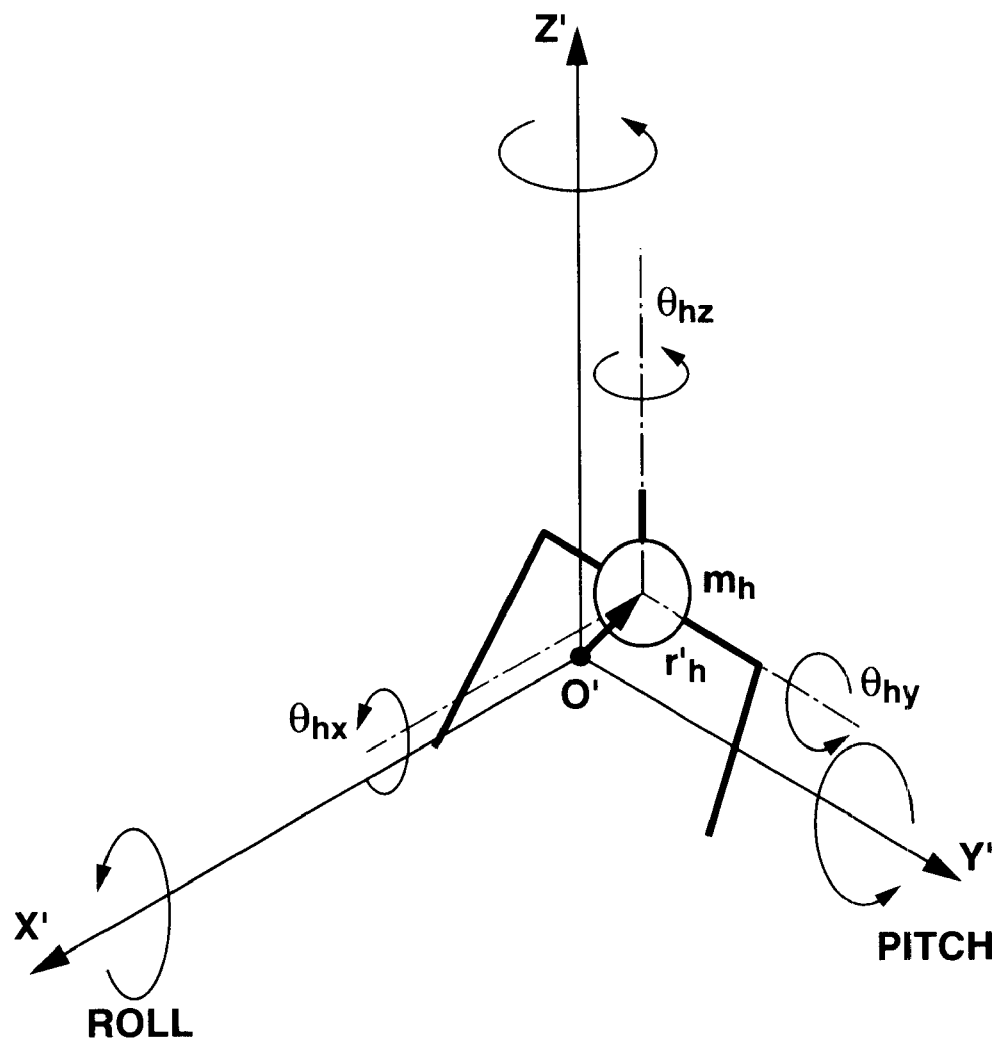
FIG. 7 shows the waist of the mass point simulating model of the robot 100 shown in FIG. 6.

In the waist site of the multiple mass point approximating model, shown in FIG. 6, the angles of rotation ($è_{hx}, è_{hy}, è_{hz}$) prescribe the attitude of the waist site of the legged mobile robot 100, that is its rotation about the roll, pitch and yaw axes. In this connection, reference is to be had to FIG. 7 showing the waist site in the multiple mass point approximating model of the legged mobile robot 100 and its vicinity to an enlarged scale.

The sequence of operations in calculating the pattern of the full-body exercise performed to make adaptive attitude stabilizing control when the legged mobile robot 100 of the present embodiment is subjected to a known external force pattern is now explained.

The multi-axis robot is designed to realize a pre-set performance by synchronously driving and controlling the respective joints, that is actuators, in accordance with motion patterns generated at the outset prior to the performance. In the case of the present embodiment of the legged mobile robot 100, optional leg motion patterns, ZMP trajectories, body trunk motion patterns, upper limb motion patterns or the attitude of the waist site ($\grave{e}_{hx}$, $\grave{e}_{hy}$, $\grave{e}_{hz}$) and the waist site motion patterns which enable a stable full-body exercising performance, accompanied by lower limb motions such as erection and walking, are generated under a working environment under which a known or predictable external force pattern is applied.

The ZMP (zero moment pattern) trajectory means a point where there is produced no moment during the time when, with the foot sole of the legged mobile robot 100 is fixed at a certain point on the floor surface, the robot executes a motion pattern as it is subjected to a known external force, resulting from walking or kicking a ball.

Figure 8:
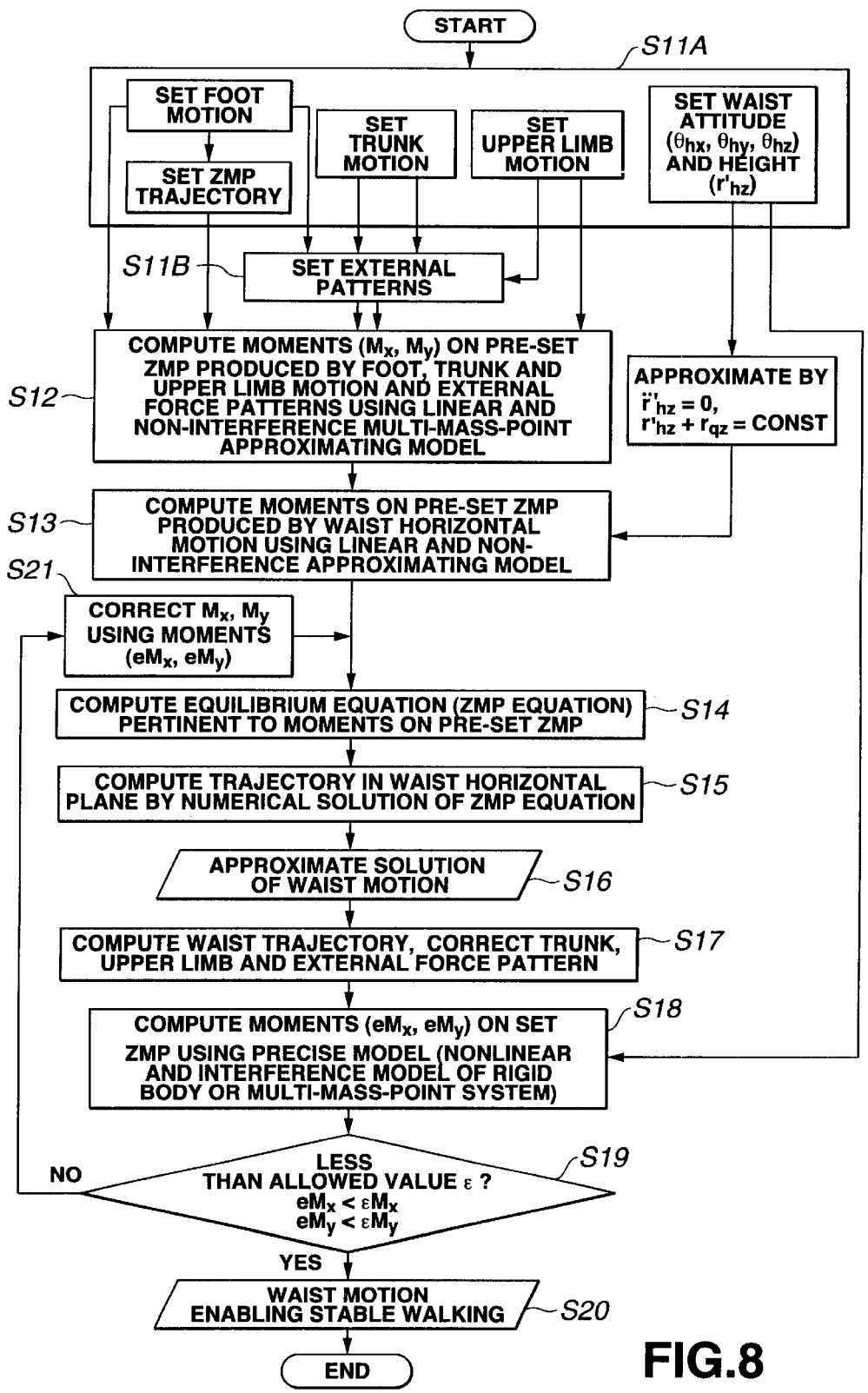
FIG. 8 is a flowchart showing a typical processing sequence for generating a full-body exercising motion pattern according to which the legged mobile robot 100 is able to perform stable motion under a pre-set external force.

FIG. 8 shows, as a flowchart, the sequence of operations in generating a full body exercising motion pattern for realizing the stable operation as the legged mobile robot 100 of the present embodiment is subjected to a known external force. It is assumed here that, in the following, the respective joint positions and the operations of the legged mobile robot 100 are described using a linear non-interference type multiple mass point approximating model shown in FIG. 6, and that parameters indicated below:

$m_h$: mass of the mass points of the waist part $r'_h(r'_{hx}, r'_{hy}, r'_{hz})$: position vector of the mass point of the waist part $m_i$: mass of the i'th mass point $r'_i$: position vector of the i'th mass point $r'_{zmp}$: position vector of the ZMP $r'F_j(r'F_{jx}, r'F_{jy}, r'F_{jx})$: position vectors of a point subjected to the j'th external force $F_j(F_{jx}, F_{jy}, F_{jz})$ j'th external force $g(g_x, g_y, g_z)$: vector of acceleration of force of gravity O'–X'Y'Z': local coordinate system (moved with the robot);

O–XYZ: absolute coordinate system

H=r'hz+rqz are used for calculations. The symbols with dash (') marks indicate parameters of a local coordinate system.

It is also presupposed that the height of the waist part of the legged mobile robot 100 is constant (r'hz+$r_{qz}$=const), the mass point of the waist part is zero and that the motion of the waist part is limited to a linear motion at an equal speed.

The sequence of operations shown in FIG. 8 is started responsive to the input such as a user command instructing an operational pattern such as walking or ball kicking by the legged mobile robot 100.

Such user command is interpreted by the main controller 111 so that a pattern actually determining the driving and operations of respective parts such as the ZMP trajectory, body trunk motion, upper limb motion, attitude of the waist part or its height, derived from motion of the leg, more specifically, the motion of the foot sole, is set (step S11A). More specifically, the foot motion pattern, followed by the ZMP trajectory, body motion pattern and upper limb motion pattern, is set. The motion of the waist part is set only in the Z' direction, while it is not known in the X' and Y' directions.

At step S11B, known external force patterns $F_1, F_2, \ldots, F_j$ are set.

If the j'th external force $F_j$ of kicking the ball with the leg is unknown, the ball can be kicked at the outset to predict the external force $F_j$. The sequence of operations in predicting the external force will be explained subsequently.

If the external force is of such a pattern that an operating point cannot be precisely set, as in the case of the knee, an approximate operating point can be set.

Using the linear non-interference multiple mass point approximate model, motions of legs, body trunk and upper limbs and the moments Mx, My about the pitch and roll axes on the pre-set ZMP generated by the known external force pattern, are calculated (step S12).

Then, using the linear non-interference multiple mass point model, the moment on the pre-set ZMP, generated by the motion in the waist part horizontal plane ($r'_{hx}$, $r'_{hy}$) is calculated (step S13).

The equation of equilibrium about the moment on the pre-set ZMP is derived on the local coordinate system O'–X'Y'Z', moving with the legged mobile robot 100 (step S14). More specifically, the moments (Mx, My) generated by the legs, body trunk and the upper limb are grouped together as a term of known variables on the right side, while the term ($r_{hx}$, $r_{hy}$) with respect to the horizontal motion of the waist part is grouped together as a term of the unknown variables on the left side, whereby a linear non-interference ZMP equation is derived.

In the multiple mass point approximation model, the following presupposition condition is given:

$$\ddot{r}'_{hz}=0$$

$$r'_{hz}+r_{qz}H(t)$$

$$H(t)=const$$

So, the term of the unknown variable in this case, that is the left side of the ZMP equation, is as follows:

$$\begin{bmatrix} m_h H(\ddot{r}'_{hz}+\ddot{r}_{qx}+g_x)-m_h g_z(r'_{hx}-r'_{zmpx}) \\ -m_h H(\ddot{r}'_{hy}+\ddot{r}_{qy}+g_y)-m_h g_z(r'_{hy}-r'_{zmpy}) \end{bmatrix}$$

On the other hand, the term of known variables (Mx, My) is constituted by the sum of moments about the pitch and roll axes generated by the motions of the legs, body trunk and upper limb portions of the legged mobile robot 100 itself ($M_{1x}$, $M_{1y}$) and the moment about the pitch and roll axes generated by a set of external force patterns given at step S11B ($M_{Ey}$, $M_{Ex}$). Therefore, the term of the known variables, that is the right side of the ZMP equation, is as follows:

$$\begin{bmatrix} M_y \\ M_x \end{bmatrix} = \begin{bmatrix} M_{1y} \\ M_{1x} \end{bmatrix} + \begin{bmatrix} M_{Ey} \\ M_{Ex} \end{bmatrix}$$

Therefore, the ZMP equation, derived at step S14, is as follows:

$$m_h H(\ddot{r}'_{hz}+\ddot{r}_{qx}+g_x)-m_h g_z(r'_{hx}-r'_{zmpx})=-M_y(t)$$

$$-m_h H(\ddot{r}'_{hy}+\ddot{r}_{qy}+g_y)+m_h g_z(r'_{hy}-r'_{zmpy})=-M_x(t)$$

Meanwhile, the moments ($M_{Ey}$, $M_{Ex}$), about the pitch and roll axes generated by the set of external force patterns, may be expressed in terms of an external force Fj, as follows:

$$\begin{bmatrix} M_{Ey}(t) \\ M_{Ex}(t) \end{bmatrix} = \begin{bmatrix} \sum_j (r'_{F_{jz}} F_{jx} - r'_{F_{jx}} F_{jz}) \\ \sum_j (r'_{F_{jy}} F_{jz} - r'_{F_{jz}} F_{jy}) \end{bmatrix}$$

The ZMP equation, derived as described above, is solved to calculate the trajectory in the waist part horizontal plane (step S15). For example, by solving the ZMP equation, using the numerical solution, such as Euler or Runge/Kutta methods, a numerical solution of the absolute horizontal position of the waist part ($r_{hx}$, $r_{hy}$) can be found as an unknown variable (step S16).

The numerical solution, found here, is an approximate solution of the waist part motion pattern, enabling stable walking or kick motion, more specifically, the absolute horizontal position of the waist part such that the ZMP is in a target position. The ZMP target position is usually set on the foot sole touching the floor surface.

If the pre-set motion of the body trunk and the upper limb cannot be realized on the as-calculated approximate solution, the pattern of motion of the body trunk and the upper limbs is re-set and corrected (step S17). At this time, the trajectory of the knee part can be calculated.

The full-body exercising motion pattern, obtained as discussed above, is substituted to calculate the moments (eM$_x$, eM$_y$) on the pre-set ZMP in a precise model, that is a precise model of the robot 100 formed of a rigid body or of an extremely large number of mass points (step S18). Although the above equation (2) is supposed to hold for a non-precise model, such premise is unneeded for a precise model. That is, H(t) need not be constant.

The moment (eM$_x$, eM$_y$) in the precise model is a moment error produced by the waist motion. At the next step S19, it is checked whether or not this moment (eM$_x$, eM$_y$) is less than the allowable value ($\epsilon$M$_x$, $\epsilon$M$_y$) of the approximate moment in the non-precise model. If the moment is less than the allowable value $\epsilon$, the full-body exercise pattern, capable of realizing a rigid solution of the stable motion pattern of the waist part and the stable skating pattern, is realized (step S20). So, the present processing routine is terminated in its entirety.

If conversely the moment in the precise model (eM$_x$, eM$_y$) is not less than the allowable value ($\epsilon$M$_x$, $\epsilon$M$_y$) of the moment in the approximate model, the produced known moments (M$_x$, M$_y$) in the approximate model are corrected at step S21, using the moments ($\epsilon$M$_x$, $\epsilon$M$_y$) in the precise model to re-derive the ZMP equation. The calculation and correction of the approximate solution of the motion pattern of the waist part are repeated until convergence to a moment value less than its allowable value $\epsilon$.

In the processing sequence, shown in FIG. 8, it is possible to calculate the full body exercise motion pattern, in which the attitude is stabilized based on the setting of the leg, trunk or upper limb motion as the robot is subjected to a known external force pattern. Of course, the external force herein is not limited to the reactive force from the kicked ball and may comprise any optional external force pattern. By applying the as-calculated full body exercise motion pattern to the legged mobile robot 100, the performance may be continued without losing attitude stability or inversion even under a known external force.

Figure 9:
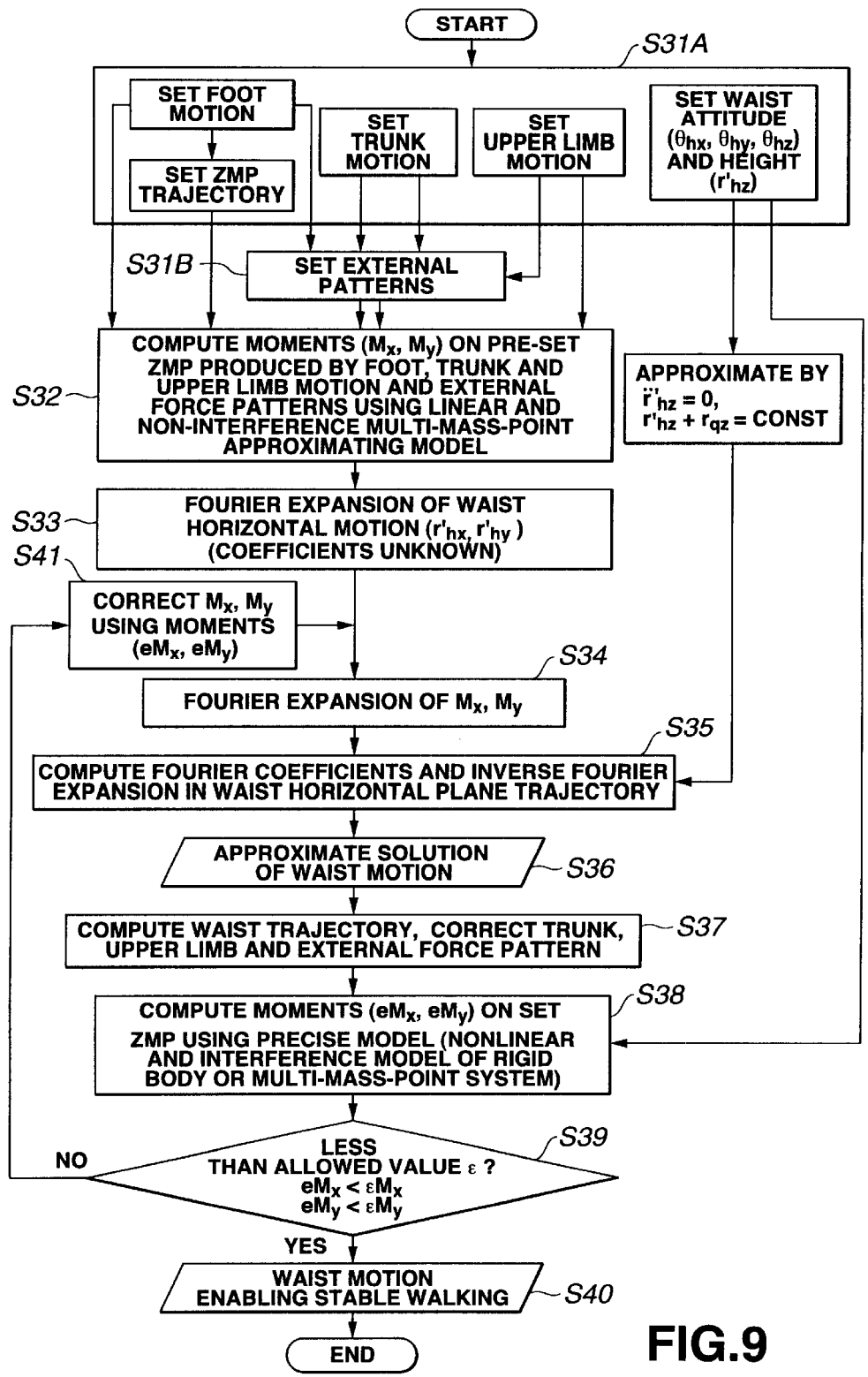
FIG. 9 is a flowchart showing another typical processing sequence for generating a full-body exercising motion pattern according to which the legged mobile robot 100 is able to perform stable motion under a pre-set external force.

FIG. 9 shows, as a flowchart, another typical full body exercise motion pattern for realizing stable performance of the legged mobile robot 100 of the present embodiment under a known external force. It is noted that, in this processing sequence, as in the case shown in FIG. 8, the joint positions or performance of the legged mobile robot 100 are described using a linear non-interference multiple mass point approximating model.

The processing sequence is started responsive to a user command instructing the performance such as walking or gesture of the robot 100.

The user command is interpreted to set a pattern for actually determining the driving and operations of motion of legs, more precisely that of foot soles, respective parts such as ZMP trajectory, trunk motion, upper limb motion or the attitude of the waist site, as derived from the leg motion (step S31A). More specifically, the pattern of the leg motion, followed by the ZMP trajectory, trunk motion pattern and upper limb motion pattern, is set. As for the motion of the waist part, only the Z-direction is set, while the X' and Y' directions are unknown.

Moreover, at step S31B, a set of known external force patterns $F_1$, $F_2$, . . . , $F_j$ are set.

For example, if the j'th external force $F_j$ of kicking a ball with a leg is unknown, it is possible to predict the external force $F_j$ actually applied on kicking the ball at the outset. The processing sequence for predicting the external force will be explained subsequently.

If, among the external force patterns, the operating point cannot be precisely set at the outset, as in case of a knee, an approximate operating point can be set.

Then, using a linear non-interference multiple mass point approximate model, the moments (M$_x$, M$_y$) about the pitch and roll axes on the pre-set ZMP generated by a known external force pattern, as well as the motions of the legs, trunk and the upper limbs, are calculated (step S32).

The motion of the waist part in the horizontal plane (r'$_{hx}$, r'$_{hy}$) are expanded into Fourier series (step S33). The expansion into Fourier series results in substitution of frequency components for time axis components, as well known in the art. That is, in the present case, the waist motions can be grasped as periodic motions. Since fast Fourier transform (FFT) can be applied, the calculating speed can be increased appreciably.

The moments about the pitch and roll axes (M$_x$, M$_y$) on the pre-set ZMP can also be expanded into Fourier series (step S34).

Then, Fourier coefficients of the trajectory in the horizontal plane of the waist part are calculated and inverse Fourier expanded (step S35) to find the approximate solution for the waist motion (step S36). The approximate solution, thus found, is an approximate solution of the absolute horizontal position of the waist prescribing the waist motion pattern that allows for stabilized walking ($r_{hx}$, $r_{hy}$) and, more specifically, the absolute horizontal position of the wist for which the ZMP is in the target position. The target ZMP position is usually set on the foot sole touching the floor surface.

If the pre-set trunk and upper limb motion cannot be realized on the calculated approximate solution, the pattern of the trunk and upper limb motion is re-set and corrected (step S37). The trajectory of the knee part can be calculated at this time.

Then, substituting the full body exercise motion pattern, obtained as described above, the moments on the pre-set ZMP in the precise model (that is a precise model of the robot 100 formed by a rigid body or by an extremely large number of mass points) are calculated (eM$_x$, eM$_y$) at step S38. Although the above equation (2) is supposed to hold for a non-precise model, such premise is unneeded for a precise model. That is, H(t) need not be constant.

The moment ($eM_x$, $eM_y$) in the precise model is a moment error produced by the waist motion. At the next step S39, it is checked whether or not this moment ($eM_x$, $eM_y$) is less than the allowable value ($\epsilon M_x$, $EM_y$) of the approximate moment in the non-precise model. If the moment is less than the allowable value $\epsilon$, the full-body exercise pattern, capable of realizing a rigid solution of the stable motion pattern of the waist part and the stable skating pattern, are realized (step S40). So, the present processing routine is terminated in its entirety.

If conversely the moment in the precise model ($eM_x$, $eM_y$) is not less than the allowable value ($\epsilon M_x$, $\epsilon M_y$) of the moment in the approximate model, the produced known moments ($M_x$, $M_y$) in the approximate model are corrected at step S41, using the moments ($\epsilon M_x$, $\epsilon M_y$) in the precise model to then carry out expansion into Fourier series. The calculation and correction of the approximate solution of the motion pattern of the waist part are repeated until convergence to a moment value less than its allowable value $\epsilon$.

It will be appreciated by those skilled in the art that adaptive full body exercise motion pattern can be realized against known external force pattern based ion the setting of the trunk or upper limb motion by the processing sequence shown in FIG. 9 in the same way as by the processing sequence shown in FIG. 8. in particular, it is possible to find periodic motions at a high speed by employing Fourier expansion instead of the numerical solution of the ZMP equation, while it is also possible to speed up the moment calculations by applying the fast Fourier transform (FFT).

Figure 10:
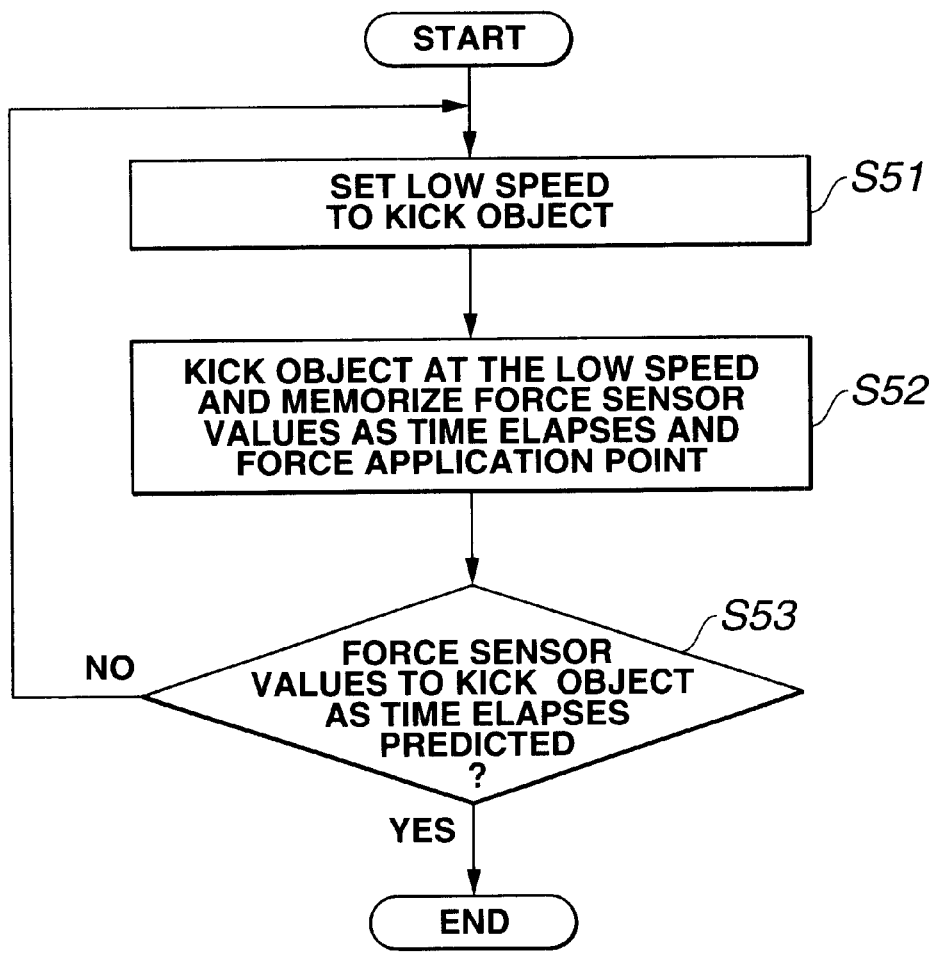
FIG. 10 is a flowchart showing the processing sequence for predicting an external force $F_j$ actually applied on kicking a ball by way of a test.

FIG. 10 shows, as a flowchart, the processing sequence for predicting the external force F actually applied on kicking a ball at the outset. This processing sequence is occasionally executed then the j'th external force $F_j$ of kicking the ball with the foot remains unknown. The respective steps of ths flowchart are hereinafter explained.

First, the speed Vt in trial kicking of an object, herein a ball, is set at step S51. It is preferred the speed Vt should be set to be sufficiently lower than the actual speed Vr in kicking of the ball.

Next, the ball is kicked at the low speed being set at step S52. The output values of the force sensors 124, 125 at the instant of kicking with lapse of time and the force acting points are input and transiently stored as data.

At step S53, it is checked whether or not the values of the external force $F_j$ produced on kicking the ball at the actual speed Vr with lapse of time are predictable.

If the result of check at step S53 is affirmative, the processing routine in its entirety is terminated. The resulting values of the produced external force $F_j$ with lapse of time are thrown into the processing for generating the full body exercise motion pattern as the external force pattern applied to the legged mobile robot 100.

If conversely the result of check at step S53 is negative, the program reverts to step S51 where another speed Vt is newly set to repeat the trials.

Although the present invention has been elucidated with reference to particular embodiments thereof, it is to be noted that the embodiment disclosed therein can be modified or substituted by those skilled in the art without departing from the scope of the invention.

In the foregoing description, the three degrees of freedom of the legged mobile robot 100, that is the body trunk pitch axis 35, body trunk roll axis 36 and the body trunk yaw axis 37, are handled as the attitude of the robot waist part (èhx, èhy, èhz). However, the waist position is to be interpreted flexibly in terms of comparison of the humanoid robot 100 to the bodily mechanism of the animals walking in an erected attitude on two legs, such as real human being or monkey.

The purport of the present invention is not limited to a product termed a "robot". That is, the present invention can be applied to a product of different technical fields, such as toys, on the condition that the product performs a motion similar to that of the human being with the aid of an electrical or mechanical operation.

Thus, the present invention has been disclosed by way of illustration and is not to be construed in a limiting meaning. For understanding the purport of the invention, reference is to be had to the definitions in the claims.

Figure 11:
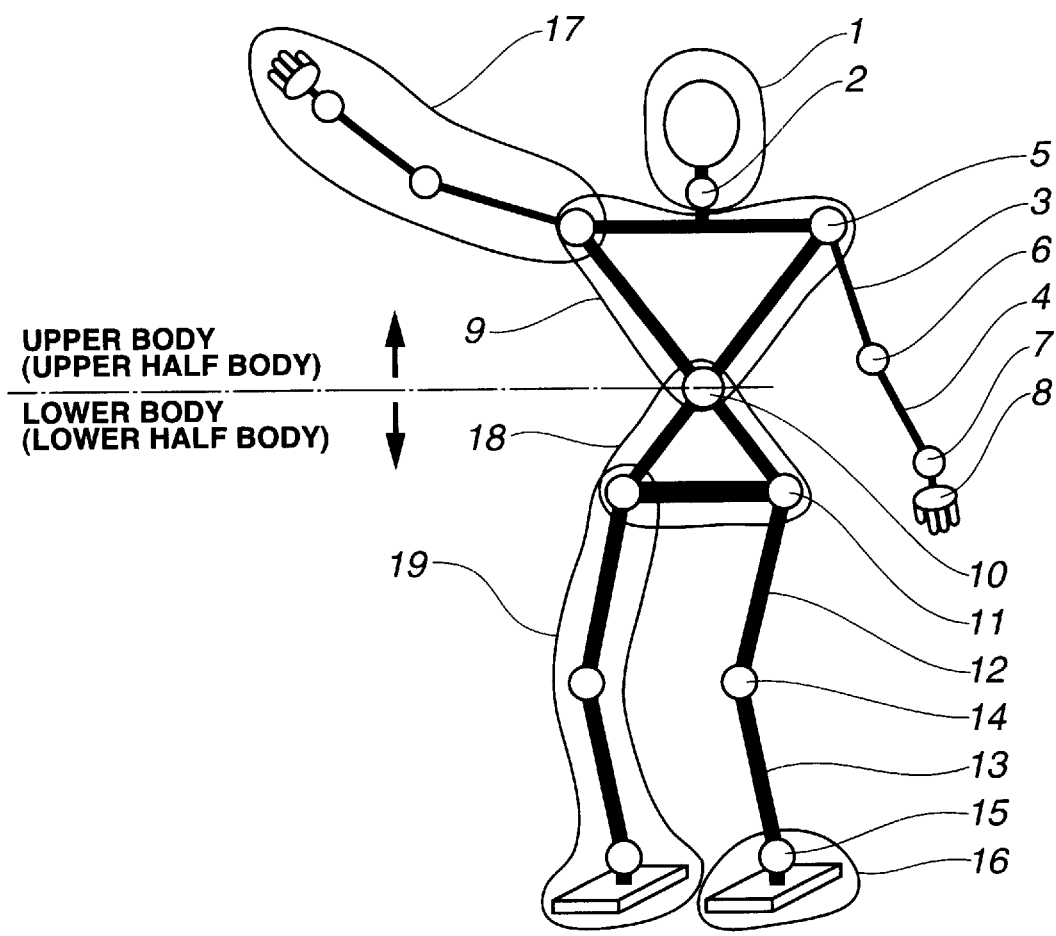
FIG. 11 schematically shows a typical joint model structure of a legged mobile robot.

For reference sake, a typical structure of an articulated model in a usual legged mobile robot termed a "humanoid" robot is shown in FIG. 11. In the illustrative structure, shown therein, a portion comprised of a site from a shoulder joint 5 to an upper arm, an elbow joint, a forearm, a wrist 7 and a hand 8 is termed an upper limb portion 7. A portion from the shoulder joint 5 to the hip joint 11 is termed a body trunk portion 9 corresponding to the trunk of the human body. The portion of the body trunk portion from the hip joint 11 to the body trunk joint 10 is termed a waist part 18. A portion below the hip joint 11, extending from the thigh 12, knee joint 14, lower thigh 13, ankle 15 and foot portion 16 is termed a lower limb 19. In general, the portions above and below the hip joint are termed an upper body and a lower body, respectively.

Figure 12:
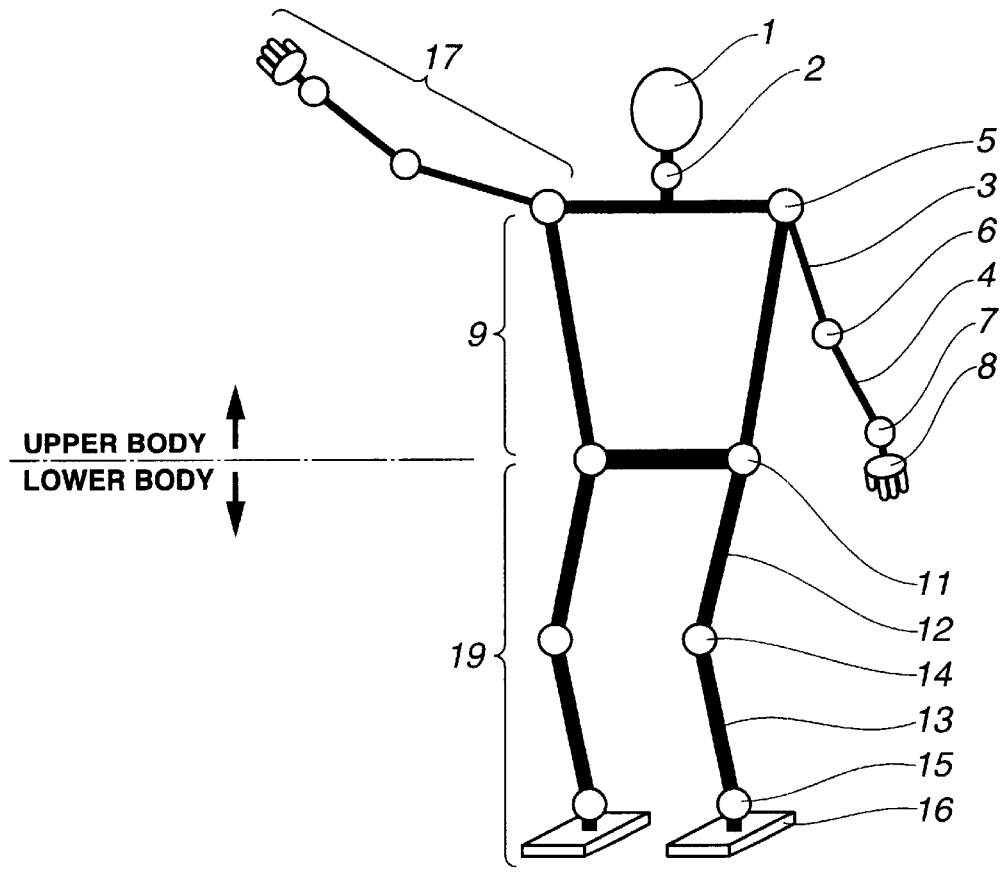
FIG. 12 schematically shows another typical joint model structure of a legged mobile robot.

FIG. 12 illustrates another articulated model structure of the legged mobile robot. The structure shown differs from the structure shown in FIG. 11 in not having the body trunk joint 10. For appellations of respective portions, reference is had to the drawings. As a result of omission of body trunk joints corresponding to the spinal structure, smoothness in motion or expressiveness in the upper body portion of the legged mobile robot is lost. However, in the case of a legged mobile robot used for certain industrial purposes, such as when the robot is taking over the dangerous or hard operations, motion of the upper body portion sometimes is not required. It is noted that reference numerals used in FIGS. 11 and 12 are not coincident with those used in the other figures.

What is claimed is:

1. An apparatus for controlling motions of a legged mobile robot, having at least lower limbs, a body trunk and a waist part, said apparatus comprising:

first setting means for setting leg motion, body trunk motion and upper limb motion, and the attitude and height of the waist part;

second setting means for setting a ZMP trajectory based on the leg motion as set by said first setting means;

third setting means for setting an external force pattern applied to the legged mobile robot;

calculating means for calculating the moment generated on the ZMP as set by said second setting means based on the leg motion, body trunk motion, upper limb motion and the attitude and height of the waist part as set;

means for finding a solution of the waist motion for which the moments as calculated by said calculating means are in equilibrium; and means for executing whole body motion based on said solution of the waist motion.

2. An apparatus for controlling motions of a legged mobile robot having at least lower limbs, a body trunk and a waist part, said apparatus comprising:

first setting means for setting leg motion, body trunk motion and upper limb motion, and the attitude and height of the waist part;

second setting means for setting a ZMP trajectory based on the leg motions as set by said first setting means;

third setting means for setting an external force pattern applied to the legged mobile robot;

calculating means for calculating the moment generated on the ZMP as set by said second setting means by the leg motion, body trunk motion, upper limb motion and the attitude and height of the waist part as set;

first finding means for finding an approximate solution of the waist motion, for which the moments as found by said calculating means are in equilibrium, using a non-precise model of said robot;

second finding means for finding an approximate solution of the waist motion, for which the moments as found by said calculating means are in equilibrium, using a precise model of said robot;

means for assuming a solution of the waist motion if a difference between said approximate solutions by said first and second finding means is less than a pre-set allowed value;

means for correcting the moments of said non-precise model on the pre-set ZMP if the difference between said approximate solutions by said first and second finding means exceeds said pre-set allowed value and for re-throwing the corrected moments to said first finding means; and means for executing whole full body exercise motion of said legged mobile robot based on the solution of said waist motion.

3. The apparatus according to claim 2 wherein said non-precise model is a linear and/or non-interference mass point approximating model for said robot; and said precise model is a rigid body model or a non-linear and/or interference mass point approximating model for said robot.

4. The apparatus according to claim 2 further comprising:

means for re-setting or correcting the pattern of said body trunk motion and upper limb motion, if the pre-set body trunk motion and upper limb motion cannot be realized with the approximate solution as found by said first finding means for finding the approximate solution of the waist motion by said non-precise model.

5. The apparatus according to claim 2 wherein said first finding means for finding the approximate solution of the waist motion by said non-precise model finds the approximate solution of the waist motion by solving an equation of equilibrium between the moment on the pre-set ZMP produced by the leg motion, body trunk motion, upper limb motion and the external force pattern, and the moment on the pre-set ZMP generated by motion within the horizontal plane of the waist part.

6. The apparatus according to claim 2 wherein said first finding means for finding the approximate solution of the waist motion by said non-precise model performs calculations on substituting a frequency-domain function for a time-domain function.

7. The apparatus according to claim 2 wherein said first finding means for finding the approximate solution of the waist motion by said non-precise model finds the approximate solution of the waist motion by applying Fourier expansion to moments on the pre-set ZMP generated by the leg motion, body trunk motion and the upper limb motion, by applying Fourier expansion to the moment on the pre-set ZMP produced by the external force pattern and to the motion in the horizontal plane of the waist part, by calculating Fourier coefficients of the trajectory of the horizontal plane of the waist part and by applying the inverse Fourier expansion.

8. The apparatus according to claim 2 wherein said third setting means for setting the external force pattern predicts an external force pattern produced on applying an impact on an object at a pre-set speed based on the chronological external force process and a force application point when the external force pattern is applied to the object at a speed lower than the pre-set speed.

9. A legged mobile robot comprising:

two or more movable legs;

an upper body portion connected to said movable legs;

means for detecting an external force applied from an external object to at least one of said movable legs; and control means for adaptively controlling the motion of said movable leg and/or the upper body portion in accordance with detected results by said external force detecting means, wherein if an external object, a mass and/or a repulsion coefficient of which is unknown, is to be kicked using one of the movable legs, said movable leg kicks the external object at a speed lower than said pre-set speed; and said control means predicts the mass and/or the repulsion coefficient when said external object is kicked at said pre-set speed, said control means adaptively controlling the operation of the movable leg and/or the upper body portion in accordance with the predicted result when the robot actually kicks the external object.

10. A method for controlling motions of a legged mobile robot having at least lower limbs, a body trunk and a waist part, said method comprising:

a first setting step for setting leg motion, body trunk motion and upper limb motion, and the attitude and height of the waist part;

a second setting step for setting a ZMP trajectory based on the leg motion as set by said first setting step;

a third setting step for setting an external force pattern applied to the legged mobile robot;

a calculating step for calculating the moments generated on the ZMP as set by said second setting step based on the leg motion, body trunk motion, upper limb motion and the attitude and height of the waist part as set;

a step for finding a solution of the waist motion for which the moments as calculated by said calculating step are in equilibrium; and a step for executing whole body motion based on said solution of the waist motion.

11. A method for controlling motions of a legged mobile robot having at least lower limbs, a body trunk and a waist part, said method comprising:

a first setting step for setting leg motion, body trunk motion and upper limb motion, and the attitude and height of the waist part;

a second setting step for setting a ZMP trajectory based on the leg motion as set by said first setting step;

a third setting step for setting an external force pattern applied to the legged mobile robot;

a calculating step for calculating the moment generated on the ZMP as set by said second setting step by the leg motion, body trunk motion, upper limb motion and the attitude and height of the waist part as set;

a first finding step for finding an approximate solution of the waist motion, for which the moments as found by said calculating step are in equilibrium, using a non-precise model of said robot;

a second finding step for finding an approximate solution of the waist motion, for which the moments as found by said calculating step are in equilibrium, using a precise model of said robot;

a step for assuming a solution of the waist motion if a difference between said approximate solutions by said first and second finding step is less than a pre-set allowed value;

a step for correcting the moments of said non-precise model on the pre-set ZMP if the difference between said approximate solutions by said first and second finding step exceeds said pre-set allowed value and for re-throwing the corrected moments to said first finding step; and a step for executing whole full body exercise motion of said legged mobile robot based on the solution of said waist motion.

12. The method according to claim 11 wherein said non-precise model is a linear and/or non-interference mass point approximating model for said robot; and said precise model is a rigid body model or a non-linear and/or interference mass point approximating model for said robot.

13. The method according to claim 11 further comprising:

a step for re-setting or correcting the pattern of said body trunk motion and upper limb motion, if the pre-set body trunk motion and upper limb motion cannot be realized with the approximate solution as found by said first finding step for finding the approximate solution of the waist motion by said non-precise model.

14. The method according to claim 11 wherein said first finding step for finding the approximate solution of the waist motion by said non-precise model finds the approximate solution of the waist motion by solving an equation of equilibrium between the moment on the pre-set ZMP produced by the leg motion, body trunk motion, upper limb motion and the external force pattern, and the moment on the pre-set ZMP generated by motion within the horizontal plane of the waist part.

15. The method according to claim 11 wherein said first finding step for finding the approximate solution of the waist motion by said non-precise model performs calculations on substituting a frequency-domain function for a time-domain function.

16. The method according to claim 11 wherein said first finding step for finding the approximate solution of the waist motion by said non-precise model finds the approximate solution of the waist motion by applying Fourier expansion to moments on the pre-set ZMP generated by the leg motion, body trunk motion and the upper limb motion, by applying Fourier expansion to the moment on the pre-set ZMP produced by the external force pattern and to the motion in the horizontal plane of the waist part, by calculating Fourier coefficients of the trajectory of the horizontal plane of the waist part and by applying the inverse Fourier expansion.

17. The method according to claim 11 wherein said third setting step for setting the external force pattern predicts an external force pattern produced on applying an impact on an object at a pre-set speed based on the chronological external force process and a force application point when the external force pattern is applied to the object at a speed lower than the pre-set speed.

18. A method for controlling the operation of a legged mobile robot made up of two or more movable legs, an upper body portion connected to said movable legs and means for detecting an external force applied from an external object to at least one of said movable legs, said method comprising the steps of:

detecting the reactive force applied when one of said movable legs has kicked an external object; and adaptively controlling the motion of said movable leg and/or the upper body portion in accordance with detected results, wherein, in case an external object a mass and/or a repulsion coefficient of which is unknown is kicked at a pre-set speed using one of said movable legs, said adaptive controlling step comprises a sub-step of trial kicking said external object at a speed lower than said pre-set speed;

a sub-step of predicting the mass and/or the repulsion coefficient on kicking the external object at said pre-set speed based on an output of said external force detection means on trial kicking; and a sub-step of adaptively controlling the motion of said movable legs and/or the upper body part in accordance with predicted results when the robot actually kicks the object.

* * * * *